Patented Aug. 7, 1945

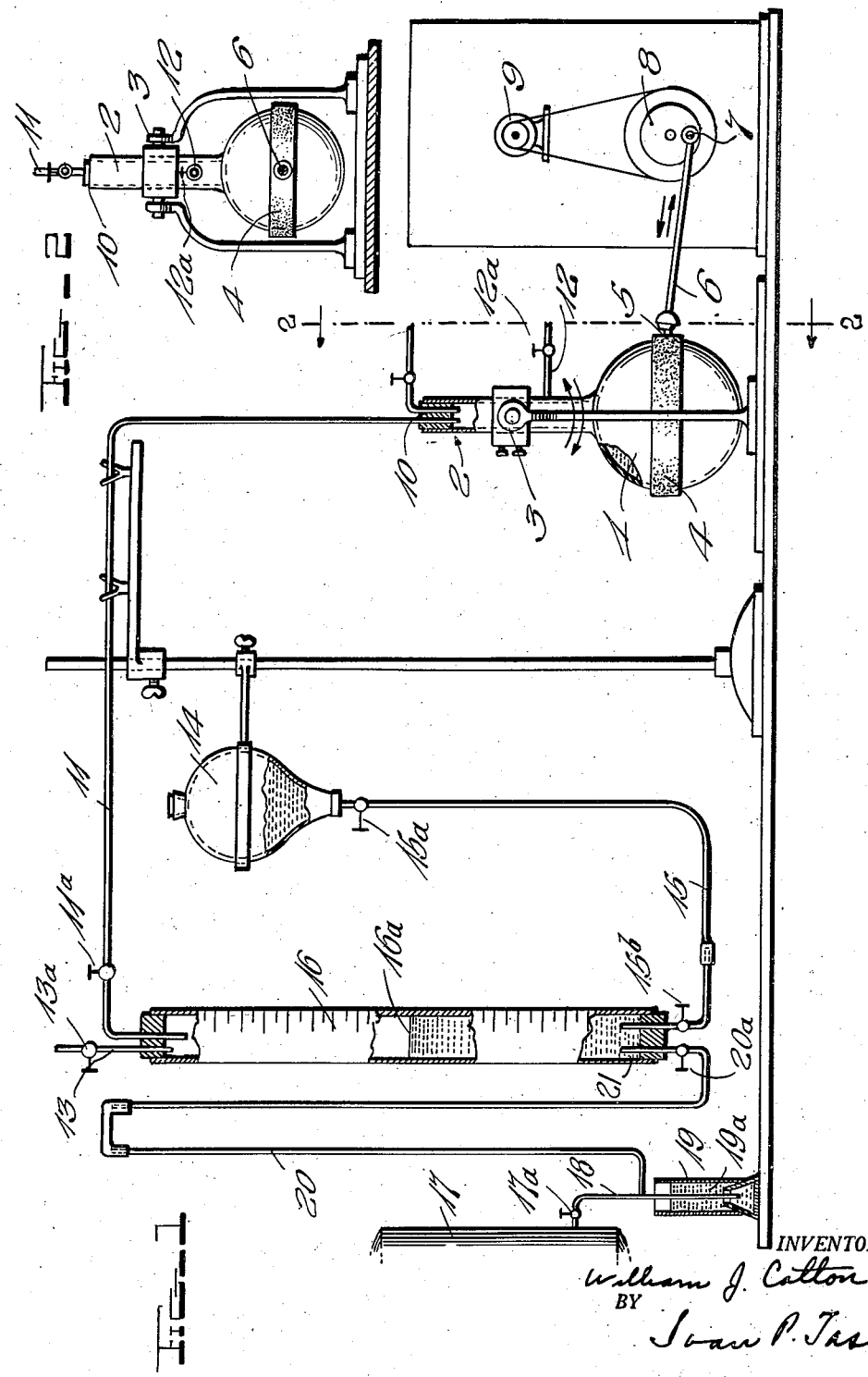

2,381,210

UNITED STATES PATENT OFFICE 2,381,210

PRODUCTION OF ZINGERONE

William J. Cotton, Chicora, Pa., assignor to Pennsylvania Coal Products Company, Petrolia, Pa., a corporation of Pennsylvania Application August 20, 1943, Serial No. 499,408

4 Claims. (Cl. 260—590)

The present invention relates to the production of zingerone from vanillalacetone.

One of the objects of the present invention is to economically and efficiently produce zingerone from vanillalacetone in a relatively short time and in good yields of a substantially pure product.

It is an additional object of the present invention to synthesize the zingerone by hydrogenation in the presence of a catalyst which because of its activity accelerates the reaction producing good yields in relatively short periods of time.

Another object of the present invention is to carry out the hydrogenation of the vanillalacetone in the presence of a hydrogen activated nickel catalyst so that when a ketonic solvent is used for the vanillalacetone, said solvent is not hydrogenated to alcohol.

Other objects of the invention will appear from the following description:

The present invention will be described in connection with the accompanying drawing in which Figure 1 is a side view partially in section of an apparatus suitable for carrying out the invention; and Fig. 2 is a cross sectional view taken on line 2—2, looking in the direction of the arrows.

Referring to the accompanying drawing, there is provided a reactor 1 which, as illustratively set forth, in a two liter flask. The neck 2 of the flask 1 is rotatively mounted in a bearing 3. Means are provided for agitating the contents of the flask 1, said means comprising a rubber band 4 fastened at 5 to the cam arm 6, which is pivoted eccentrically at the pivot point 7 on the cam wheel 8, which is driven by the motor 9. The reciprocation of the cam arm 6 serves to agitate the contents of the reactor member 1.

The charge may be introduced in the reactor 1 with the latter either fastened in place, as shown in the drawing, or the retactor may be removed from its mounting and after charging reinserted in the bearing member 3. Illustratively, there may be placed in the reactor 1, 200 grams of vanillalacetone having a melting point of about 124° C., together with a 1000 cc. of acetone. To the solution of vanillalacetone dissolved in acetone, there may be added approximately 6 grams of Raney finely precipitated nickel catalyst, that is 10 cc. of prepared sludge, said Raney catalyst being prepared by treating the Raney mixture as it is commercially furnished with a caustic soda solution. During the preparation of the catalyst, the aluminum is dissolved out of the mixture by the caustic soda; the resulting sodium aluminate is then washed away, leaving a finely divided nickel catalyst.

With the reactor in place, the rubber stopper 10 is tightly adjusted to the neck 2 of the flask, valve 11a controlling the entry of hydrogen by means of the conduit 11 into the flask 1 is closed; and valve 12a of air exhaust conduit 12 opened. The conduit 12 is connected to a vacuum which is not shown, and the air content of the flask, or as much thereof as possible, is removed from the flask. Thereafter, the valve 12 is closed. The conduit 11 is connected to a burette 16 which is provided with a valve 13a fitted on the conduit 13, said burette being also connected by means of the conduit 15 to the leveling flask 14, said conduit 15 being provided with a valve member 15a adjacent the lower portion of the leveling flask 14, and a valve 15b adjacent the end of the conduit which enters the lower portion of the burette 16. The valve 13a is opened and the leveling flask 14 is raised until the water level 16a in the burette 16 rises to a point that practically fills the burette. Thereafter, the valve 13a is closed and the valve 17a opened, said valve connecting with the hydrogen cylinder 17 wherein there is provided a source of hydrogen under pressure. There is also provided a mercury cell 19 into which dips the leg 18, the lower portion of said leg being sealed in the mercury 19a. If excessive pressure of hydrogen develops in the system, then the system fails by blowing said excess of hydrogen through the mercury seal, thereby preventing the apparatus from bursting. With valve 17a open, hydrogen from the hydrogen container 17 passes through pipe 18, and through and over the barometric leg 20, and then into the bottom of the hydrogen burette 16, valve 20a having been first opened. The lower portion 21 of the barometric leg 20 terminates, as shown in the lower part of the burette 16. The purpose of the barometric leg 20 is to prevent water from the hydrogen burette 16 from passing into the mercury trap 19 and through the pipe 18. As hydrogen rises in the burette 16, it displaces the water, forcing it into the leveling flask 14 which should be lowered at such a rate as to maintain the water level in flask 14 at about the same height as the water level in the burette 16. When the burette 16 is filled with hydrogen, valves 17a and 20a are closed, and the leveling flask 14 carefully adjusted to the level the same as that in burette 16. The volume on the burette is read as well as the barometric reading, and the temperature of the water in the leveling flask 14.

Thereafter, the valve 11a is opened and the leveling flask 14 is raised, thereby forcing the hydrogen from the burette into the reactor 1. As pressure develops in the reactor due to a compression of the hydrogen, the pressure is gradually released by means of the valve 12a. In order to ascertain the volume of hydrogen delivered to the flask 1, the water level in the burette 16 is raised to almost the top of the burette, then the water levels in burette 16 and in flask 14 are adjusted to the same level, and the volume is then read on the burette 16. The difference between the initial and final readings is the volume of hydrogen forced in the reactor 1 at the given barometer pressure and at the temperature of the water. Thereafter the valve 11a may be closed and the reactor 1 again evacuated by connecting valve 12 to a vacuum if it is desired to completely remove all the air in the system. In fact, by repeating this procedure a number of times, the air in the system may be completely displaced and if the readings are carefully taken the percentage of air remaining in the system may be accurately calculated.

In starting operations, the motor 9 is caused to agitate the contents of the reactor 1, said motor being connected to the rubber band 4 by the assemblage of elements hereinbefore described. In the manner hereinbefore set forth, hydrogen is forced into the reactor with the valve 12a closed, there being maintained preferably a slight pressure of hydrogen. Even at room temperature the hydrogen is rapidly absorbed by the vanillalacetone. For the charge above set forth, namely 200 grams of vanillalacetone and 1000 cc. of acetone, the theoretical requirement of hydrogen is 24.9 liters at 712 millimeter barometer pressure after correcting for the vapor pressure of water which in this case was 22 millimeters. Assuming that the burette 16 is a one liter burette, in the course of one reaction it will have to be filled and emptied about twenty-five times. In this example, the average time for absorption for one liter of hydrogen was four minutes and the average time for refilling the burette was one minute. Therefore, the total over all time was 135 minutes, the actual time of the reaction being less than two hours. In order to provide for a slight excess of hydrogen, an additional 2.5 liters of hydrogen is used, making a total of 27.4 liters or 110% of the theoretical amount of hydrogen. The purpose of this additional 10% of hydrogen is to insure sufficient hydrogen to obtain a substantially complete reaction.

After the hydrogenation is complete, the reactor 1 is removed from its bearing member, the contents thereof allowed to settle, and the clear supernatant liquor is decanted. The acetone is removed by distillation over a water bath in the usual manner. The residue after the removal of the acetone is vacuum distilled at a suitable pressure, as for example 7 to 8 millimeters. The yield of the crude zingerone thus obtained was 89.3% of the theoretical, and the crude had a melting point of 36° C. The crude zingerone is recrystallized from acetone in the usual manner. The yield of recrystallized zingerone approximates 91 to 92% taken on the crude, or 82% over all taken on the vanillalacetone charge to the reactor 1. The melting point of the recrystallized zingerone ranges from 40.5 to 41.5° C.

Instead of dissolving the vanillalacetone in acetone, as set forth, the vanillalacetone may be dissolved in any solvent which will not be affected by the hydrogenation under the conditions under which the reaction is carried out. Among the solvents that may be used are methanol, ethanol, acetone, ether, petroleum ether, dioxan and the like. It is preferred to use a solvent in which the vanillalacetone is soluble to a maximum extent. For this reason it is preferred that the vanillalacetone be dissolved in acetone in preference to ethanol. It is desired to point out that when the vanillalacetone is dissolved in solvents which contain ketonic oxygen, as for example acetone, the pressure of the system must be adjusted to prevent the hydrogenation of the ketonic oxygen or the solvent containing the same to alcohol. Therefore, in carrying out the present invention, the hydrogenation of the acetone or other ketonic oxygen solvent to alcohol is prevented.

In the example herein set forth, a fairly concentrated solution of vanillalacetone in acetone is used. While high concentration is preferable because increased capacity is obtained, it is not necessary to work with concentrated solutions. For example, 5 grams of vanillalacetone may be dissolved in 100 cc. of 95% ethanol and the solution introduced into the reactor 1 together with an appropriate amount of Raney catalyst, as for example 1 cc. of Raney nickel sludge.

In accordance with one form of the present invention, a slurry of vanillalacetone may be hydrogenated in the presence of a finely divided activated nickel catalyst. This slurry may be obtained by dissolving as much of the vanillalacetone as possible in the solvent, as for example acetone or ethanol, and then having present an excess of vanillalacetone, as for example 10 to 25% of undissolved vanillalacetone. The vanillalacetone in the presence of the hydrogen and in the presence of a saturated solution of vanillalacetone in the solvent becomes hydrogenated.

In carrying out the present invention, the hydrogen activated nickel catalyst may be used, and especially the Raney hydrogenated nickel catalyst may be used in amounts varying from 3 to 12%, taken on the weight of the vanillalacetone which is reacted. It is preferred to have 3 to 12% of the catalyst present during the reaction. However, it is not necessary to use new catalyst for each reaction as the catalyst can be reused a great number of times. When operations indicate that the catalyst has been poisoned, it may be removed from the reactor and either revivified or discarded, depending on which is cheaper. In one form of the invention, there may be automatically added to the reactor 1 for each bath a small proportion of new catalyst, this amount being about 1% to 5% of the weight of the catalyst used.

It may be pointed out that the theoretical amount of hydrogen used for hydrogenation should only be slightly exceeded, since to use more than about 10% excess of the theoretical quantity of hydrogen involves the possibility of an initiation of reduction of the carbonyl groups present in the zingerone. Further, it is desired to state that the vanillalacetone should be substantially completely hydrogenated, since if substantial hydrogenation is not effected, vanillalacetone appears as an impurity in the zingerone, and further this increases the difficulty of purifying the crude zingerone produced in accordance with the present invention.

While the production of zingerone in accordance with the present invention has been disclosed in connection with a process wherein room temperature, that is, about 20° to 35° C., is used, and substantially atmospheric pressure is used, it is within the province of the invention to carry out the process by using slightly higher temperatures and considerably higher pressures. The temperature range may be from 0° C. to the boiling point of the solvent, but preferably as indicated above. The pressure may range from slightly subatmospheric to about 10 atmospheres, although preferably from slightly subatmospheric to 3 atmospheres.

The chemical reaction involved in this process, expressed in the usual structural formula, is as follows:

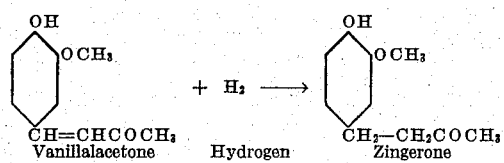

What is claimed is:

1. The method of producing zingerone comprising forming a solution consisting of vanillalacetone dissolved in a solvent selected from the group consisting of methanol, ethanol, acetone, ether, petroleum ether and dioxan, mixing therewith finely divided Raney nickel catalyst, subjecting the mixture to hydrogenation, and recovering zingerone from the reaction product.

2. The method of producing zingerone comprising forming a solution consisting of vanillalacetone dissolved in acetone, mixing therewith finely divided Raney nickel catalyst, subjecting the mixture to hydrogenation, and recovering zingerone from the reaction product.

3. The method of producing zingerone comprising forming a solution consisting of vanillalacetone dissolved in ethanol, mixing therewith finely divided Raney nickel catalyst, subjecting the mixture to hydrogenation, and recovering zingerone from the reaction product.

4. The method of producing zingerone comprising forming a solution consisting of vanillalacetone dissolved in a solvent selected from the group consisting of methanol, ethanol, acetone, ether, petroleum ether and dioxan, mixing therewith finely divided Raney nickel catalyst, and subjecting the mixture to hydrogenation at a temperature varying from 20° C. to about 35° C., and under a presure varying between about atmospheric pressure and about 10 atmospheres, and recovering the solvent and zingerone from the reaction product.

WILLIAM J. COTTON.